US010330502B2

(12) United States Patent
Cipullo et al.

(10) Patent No.: US 10,330,502 B2
(45) Date of Patent: Jun. 25, 2019

(54) FIBRE-OPTIC COMMUNICATION SYSTEM, A COMMUNICATION APPARATUS FOR THE SAME, AND A VEHICLE

(71) Applicant: Airbus Operations Limited, Bristol (GB)

(72) Inventors: Alessio Cipullo, Bristol (GB); Christopher J. Wood, Bristol (GB); Kayvon Barad, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 15/824,436

(22) Filed: Nov. 28, 2017

(65) Prior Publication Data

US 2018/0149498 A1 May 31, 2018

(30) Foreign Application Priority Data

Nov. 28, 2016 (GB) .................................. 1620051.1

(51) Int. Cl.
*G02B 6/12* (2006.01)
*G01D 5/353* (2006.01)
(Continued)

(52) U.S. Cl.
CPC .......... *G01D 5/35316* (2013.01); *G01L 1/246* (2013.01); *G02B 6/022* (2013.01);
(Continued)

(58) Field of Classification Search
CPC ................................... G02B 6/12; G01D 5/353
(Continued)

(56) References Cited

U.S. PATENT DOCUMENTS 5,401,956 A * 3/1995 Dunphy ............. G01D 5/35312
250/227.18
5,675,674 A 10/1997 Weis
(Continued)

FOREIGN PATENT DOCUMENTS

CN 102208737 10/2011

OTHER PUBLICATIONS

Combined Search and Examination Report for GB1620051.1, dated May 22, 2017, 7 pages.
(Continued)

*Primary Examiner* — Kaveh C Kianni
(74) *Attorney, Agent, or Firm* — Nixon & Vanderhye P.C.

(57) ABSTRACT

A communication apparatus for a fiber-optic communication system for an aircraft that includes: an optical coupler; an input port optically coupled to the optical coupler via a first waveguide, the input port arranged to receive light; a modulator optically coupled to the optical coupler via a second waveguide, the modulator having a logic input and a fiber having a fiber Bragg grating (FBG) receiving light from the input port via the optical coupler, the modulator operable to vary a strain force applied to the fiber according to a logic signal received at the logic input to modulate a wavelength of a modulated light signal reflected by the FBG back to the optical coupler; and an output port optically coupled to the optical coupler via a third waveguide to receive the modulated light signal therefrom, the output port being operable to output the modulated light signal.

18 Claims, 8 Drawing Sheets

(51) Int. Cl.
*G02B 6/02* (2006.01)
*G02B 6/293* (2006.01)
*G08C 23/06* (2006.01)
*G01L 1/24* (2006.01)
*G02F 1/01* (2006.01)
*H04J 14/02* (2006.01)

(52) U.S. Cl.
CPC ..... *G02B 6/12007* (2013.01); *G02B 6/29322* (2013.01); *G08C 23/06* (2013.01); *G02B 6/2932* (2013.01); *G02B 2006/12142* (2013.01); *G02B 2006/12147* (2013.01); *G02F 1/0134* (2013.01); *H04J 14/0241* (2013.01)

(58) Field of Classification Search
USPC .......................................................... 385/31
See application file for complete search history.

(56) References Cited

U.S. PATENT DOCUMENTS

| 5,898,517 | A | * | 4/1999 | Weis | E21B 47/123 356/32 |
|---|---|---|---|---|---|
| 6,055,348 | A | | 4/2000 | Jin et al. | |
| 6,148,127 | A | | 11/2000 | Adams et al. | |
| 6,154,590 | A | | 11/2000 | Jin et al. | |
| 2003/0086647 | A1 | | 5/2003 | Willner et al. | |
| 2003/0128924 | A1 | | 7/2003 | Boettcher et al. | |
| 2003/0168939 | A1 | | 9/2003 | Talebpour et al. | |
| 2011/0134344 | A1 | * | 6/2011 | Marcus | H04N 9/3105 348/752 |

OTHER PUBLICATIONS

European Search Report cited in EP 17203999t9, dated Apr. 11, 2018, 17 pages.

* cited by examiner

FIBRE-OPTIC COMMUNICATION SYSTEM, A COMMUNICATION APPARATUS FOR THE SAME, AND A VEHICLE

RELATED APPLICATION

This application claims priority to United Kingdom Patent (GB) Application 1620051.1 filed Nov. 28, 2016, the entirety of which is incorporated by reference.

FIELD OF THE INVENTION

The present invention relates to a fibre-optic communication system, a communication apparatus for the same, and a vehicle. Various embodiments relate to systems and methods for varying a strain force applied to a fibre containing a fibre Bragg grating (FBG) according to a logic signal to modulate a wavelength of light reflected by the FBG. Specific embodiments relate to a vehicle including such systems and methods.

BACKGROUND OF THE INVENTION

Within the field of data communication there is often a need to transmit and receive information or data between different electronic components within an environment. The environment may be geographically localized, such as, for example, a building, an automobile, an aircraft, or a boat. Also, the environment may be geographically dispersed, such as, for example, across multiple cities, countries, or continents. Such data transfers may be done in a variety of different ways and using a variety of different media. For example, electrical signals may transfer data as electricity within electrical wires, or optical signals may transfer data as light within optical fibres.

Accordingly, there is a continuing need to develop improved systems and methods for exchanging data between different electrical components.

U.S. patent application Ser. No. 10/315,234 having publication no. 2003/0168939 discloses a method to actuate a fiber-Bragg grating (FBG) using piezoelectric actuators. In this method, the displacement of the piezoelectric actuator will induce a strain in the FBG, resulting in a shift of the Bragg wavelength ($\lambda$Bragg). A suitable application of this device is in optical communications for the controlled switching or filtering of a channel within a specified bandwidth. The piezoelectric actuator is driven by applying effective voltage versus time profiles to the piezoelectric actuator coupled to a fiber Bragg grating to vary strain in the fiber portion containing the grating in order to switch the selected wavelengths of light reflected and/or transmitted by the fiber-Bragg grating. The effective voltage versus time profiles are selected to rapidly change the strain in the selected section of the optical fiber in such a way so as to compensate for effects of creep in the piezoelectric actuator due to the application of voltage thereto and to obtain convergence to a substantially fixed strain in the optical fiber in a pre-selected period of time. This same approach may be used in other applications where on/off type movements are of importance.

SUMMARY OF THE INVENTION

A first aspect of the invention provides a communication apparatus for a fibre-optic communication system, the apparatus comprising: an optical coupler; an input port optically coupled to the optical coupler via a first waveguide, the input port being arranged to receive light; a modulator optically coupled to the optical coupler via a second waveguide, the modulator comprising a logic input and a fibre having a fibre Bragg grating (FBG) arranged to receive the light from the input port via the optical coupler, the modulator being operable to vary a strain force applied to the fibre according to a logic signal received at the logic input to modulate a wavelength of a modulated light signal reflected by the FBG back to the optical coupler; and an output port optically coupled to the optical coupler via a third waveguide so as to receive the modulated light signal therefrom, the output port being operable to output the modulated light signal.

In an embodiment, the logic signal is an electrical signal, and wherein the modulator comprises a transducer physically coupled to the fibre and in electrical communication with the logic input, the transducer being operable to generate the strain force based on the electrical logic signal. In an embodiment, the transducer is an electro-magneto-mechanical transducer or an electro-mechanical transducer.

In an embodiment, the logic signal is a mechanical signal, and wherein the modulator comprises a mechanical actuator physically coupled to the fibre and in mechanical communication with the logic input, the mechanical actuator being operable to generate the strain force based on the mechanical logic signal. In an embodiment, the logic input comprises a push button, and wherein actuating the push button generates the mechanical logic signal.

In an embodiment, the communication apparatus further comprises a visual indicator in optical communication with the modulator so as to receive at least part of the modulated light signal therefrom, the visual indicator being operable to generate a visual indication based on the at least part of the modulated light signal. In an embodiment, the visual indicator comprises: a light port, or a photoluminescent material. In an embodiment, the push button comprises the visual indicator.

In an embodiment, the modulator further comprises: an extra optical coupler located within the second waveguide, and a semi-reflective reflector in optical communication with the extra optical coupler and the visual indicator, wherein the extra optical coupler is operable to transmit the light from the optical coupler to the FBG, to transmit the modulated light signal from the FBG to the semi-reflective reflector, and to transmit light reflected by the semi-reflective reflector to the optical coupler, wherein the semi-reflective reflector is operable to transmit a first portion of the modulated light signal to the visual indicator and to reflect a remaining portion of the modulated light signal to the extra optical coupler.

In an embodiment, the communication apparatus further comprises an optical filter positioned in an optical path between the semi-reflective reflector and the visual indicator, the optical filter being operable to transmit light to, or block light from, the visual indicator based on a wavelength of the light.

In an embodiment, the modulator further comprises a light absorption element optically coupled to the fibre so as to absorb light transmitted by the FBG.

In an embodiment, the communication apparatus further comprises a light source optically coupled to the input port, the light source being operable to generate the light. In an embodiment, the light source is a broadband light source or a swept laser.

In an embodiment, the logic signal is a binary signal and the modulator is configured to set the strain force to either one of two different values such that the wavelength of the modulated light signal is set to either one of two different wavebands.

In an embodiment, the communication apparatus further comprises: an additional input port, an additional modulator, an additional optical coupler, and an additional output port; the additional input port being optically coupled to the additional optical coupler via a fourth waveguide, the additional input port being arranged to receive the light; the additional modulator being optically coupled to the additional optical coupler via a fifth waveguide, the additional modulator comprising an additional logic input and an additional fibre having an additional FBG arranged to receive the light from the additional input port via the additional optical coupler, the additional modulator being operable to vary a strain force applied to the additional fibre according to a logic signal received at the additional logic input so as to modulate a wavelength of an additional modulated light signal reflected by the additional FBG back to the additional optical coupler; and the additional output port being optically coupled to the additional optical coupler via a sixth waveguide so as to receive the additional modulated light signal therefrom, the additional output port being operable to output the additional modulated light signal. In an embodiment, the light source is optically coupled to the additional input port.

A second aspect of the invention provides a fibre-optic communication system comprising: a communication apparatus according to the first aspect of the invention; and an optical detector in optical communication with the output port of the communication apparatus so as to receive the modulated light signal therefrom, the optical detector being operable to detect a wavelength of the modulated light signal and to extract the logic signal from the detected wavelength.

In an embodiment, the optical detector comprises a spectrometer. In an embodiment, the optical detector comprises: an optical splitter, an optical filter, a first photodetector, a second photodetector, and a logic unit; wherein the optical splitter is arranged to transmit the modulated light signal along a first optical detection path to the logic unit and along a second optical detection path to the logic unit, the first optical detection path containing the first photodetector, and the second optical detection path containing the optical filter and the second photodetector, the optical filter being operable to permit or prevent light reaching the second photodetector based on a wavelength of the light; and wherein the logic unit is operable to extract the logic signal by generating: a first logic state if both photodetectors detect light, a second logic state if only one photodetector detects light, and a fault state if neither photodetector detects light.

A third aspect of the invention provides a vehicle comprising a communication apparatus for a fibre-optic communication system, the communication apparatus comprising: an optical coupler; an input port optically coupled to the optical coupler via a first waveguide, the input port being arranged to receive light; a modulator optically coupled to the optical coupler via a second waveguide, the modulator comprising a logic input and a fibre having a fibre Bragg grating (FBG) arranged to receive the light from the input port via the optical coupler, the modulator being operable to vary a strain force applied to the fibre according to a logic signal received at the logic input so as to modulate a wavelength of a modulated light signal reflected by the FBG back to the optical coupler; and an output port optically coupled to the optical coupler via a third waveguide so as to receive the modulated light signal therefrom, the output port being operable to output the modulated light signal.

The further features and advantages stated above in respect of the first and second aspects of the invention are hereby restated in respect of the third aspect of the invention.

BRIEF DESCRIPTION OF THE DRAWINGS

Embodiments of the invention will now be described with reference to the accompanying drawings, wherein like reference signs relate to like components, and in which.

DETAILED DESCRIPTION OF EMBODIMENT(S)

Figure 1:
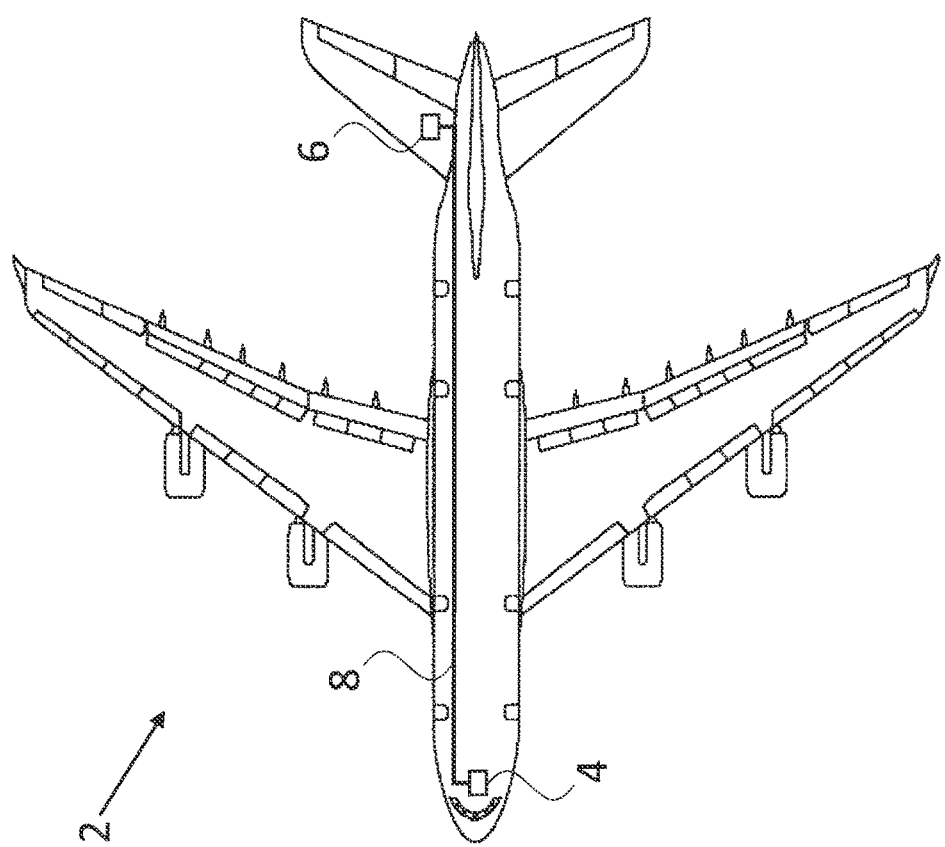
FIG. 1 is a schematic diagram of a fibre-optic communication system located on-board a vehicle, in accordance with an embodiment of the invention.

It is known to provide discrete signal output (DSO) devices using electronic components wherein each different logic state (e.g. '0' or '1') corresponds to a different electrical state (e.g. ground or 28V). In applications on-board aircraft, it is typical to use only two logic/electrical states in an effort to mitigate the negative effects of noise. Such aircraft systems may be used to transmit discrete signals for command or control purposes between, for example, avionics equipment or other aircraft equipment.

The working environment of an aircraft is associated with some specific factors which may not be relevant in some other working environments. These factors can be problematic for DSO devices which are electrical. For instance, protection is needed against lightening induced transients (e.g. as per DO160E, Section 22, Cat A3 and B3). Also, protection is needed against power input abnormal surge (e.g. as per DO160E, Section 16, cat Z). Additionally, protection is needed against electromagnetic interference or hazards, such as, for example, shielding of electrical conductors.

Further, there is a need to define solutions (including architecture) to ensure that short circuits through an electrical line do not propagate to other electrical circuits (e.g. protection against fault propagation). Such solutions are often a significant source of weight, noise (affecting nearby high accuracy interfaces), and heat. Also, such solutions can take up a significant amount of space on an aircraft. Further, such solutions can have a negative impact on reliability and can contribute to complex interactions with inductive loads.

Furthermore, electrical systems are sensitive to ground reference voltage fluctuations. Also, current wired logic-OR gate solutions require high dependability passivation signals to prevent busbar shorting.

Optical communication systems can be attractive for aircraft use. For instance, because optical communication systems are optical (rather than electrical) in nature, such systems possess a natural level of immunity to electromagnetic interference or hazards. Accordingly, the need for shielding is reduced or eliminated. Also, optical communication systems tend not to conduct direct or indirect currents generated when lightning strikes the aircraft. One reason for this is that non-electrically conductive materials (e.g. optical fibre) can be used in the manufacture of optical communication systems. Accordingly, the need to electrically isolate the ends of the optical communication system from each other is reduced or eliminated because electricity cannot be transmitted in optical fibre. Additionally, optical communication systems can be physically lighter than equivalent electrical communication systems owing to the fact that optical fibre tends to be lighter than electrical cabling. This can be particularly attractive in aircraft since there is a continuing drive to reduce weight so as to reduce aircraft fuel consumption.

Various embodiments of the invention aim to address the aforementioned problems with electrical devices (such as electrical DSO devices) by providing an optical communication apparatus which generates a wavelength modulated light signal. In an embodiment, there is provided a communication apparatus for a fibre-optic communication system. The communication apparatus may be in optical communication with a light source so as to receive light therefrom. The communication apparatus may include: an input port for receiving the light from the light source, a modulator for generating a modulated light signal from the light, and an output port for outputting the modulated light signal. The output port may be in optical communication with a detector via an optical fibre so as to provide the modulated light signal to the detector. The input port, the modulator, and output port may be optically coupled together via an optical coupler. Also, each of the input port, the modulator, and the output port may be optically coupled to the optical coupler via a separate waveguide.

In an embodiment, the modulator includes a logic input and a fibre having a fibre Bragg grating (FBG) arranged to receive the light from the input port via the optical coupler. The modulator is operable to vary a strain force applied to the fibre according to a logic signal received at the logic input to modulate a wavelength of the light reflected by the FBG back to the optical coupler. In this way, the modulated light signal is generated and output from the modulator to the optical coupler. The logic signal may be an electrical signal or a mechanical signal, and the modulator may be adapted accordingly to generate a strain force which corresponds to the logic signal. For example, where the logic signal is electrical, the modulator may include a transducer in electrical communication with the logic input and physically coupled (e.g. via a bonding agent or adhesive, or by press-fitting, or otherwise) to the fibre. The transducer may be an electro-mechanical transducer or an electro-magnetic-mechanical transducer. Alternatively, where the logic signal is mechanical, the modulator may include a mechanical actuator in mechanical communication with the logic input and physically coupled (e.g. via a bonding agent or adhesive, or by press-fitting, or otherwise) to the fibre. In this latter case, the logic input may be a push-button. Additionally, the push-button may include a visual indicator so as to identify a current logic state based on the modulated light signal.

In summary, various embodiments provide a communication apparatus for an optical communication system. Optical communication systems can be more attractive for use in vehicles such as aircraft than electrical systems. Also, the communication apparatus is configured to modulate a wavelength of a light signal emitted by the communication apparatus based on a logic signal received by the communication apparatus. The logic signal can be a discrete signal, such as a binary signal. In this way, various embodiments can provide an optical discrete signal output device which is based on discrete wavelength modulation using an FBG.

Various specific embodiments of the invention will now be described with reference to FIGS. 1 to 8.

FIG. 1 illustrates an example environment within which various embodiments may operate. Specifically, the example environment is represented by a vehicle, such as, an aircraft 2. In the present embodiment, the aircraft 2 is a passenger airplane; however, it is to be understood that other types of aircraft may provide a suitable working environment for embodiments of the invention. For example, the aircraft 2 may be a different type of fixed wing aircraft, such as, for example, a cargo airplane, a military transport airplane, or a military fighter jet. Also, the aircraft 2 may be a different type of aircraft, such as, for example, a rotating wing aircraft (e.g. a helicopter) or an unmanned aerial vehicle (e.g. a military drone).

It is also to be understood that various embodiments may operate in a different environment to an aircraft. For example, at least some embodiments may be suitable for use in various land, sea, space or air vehicles. For instance, some other vehicle environments may include at least some of the above-mentioned environmental considerations related to aircraft, such as, high noise levels, lightning strikes, electric surges, electromagnetic interference, space and weight restrictions. As such, in various embodiments, the communication apparatus or system is located on a land vehicle (e.g. an automobile, a truck, a train, a lorry, a monorail), a water vehicle (e.g. a boat, a ship, a hovercraft, a hydrofoil), or a space vehicle (e.g. a space shuttle or a space station). Alternatively, in some other embodiments, the communication apparatus or system is located on a stationary object such as, a building or a land-based pylon. For clarity, the following embodiments will be described with reference to aircraft; however, it is to be understood that this is only one possible type of example environment or example vehicle environment.

In any case, returning to the example embodiment of FIG. 1, there is shown a fibre-optic communication system having a transmission unit 4 in optical communication with a detector 6 via an optical fibre 8. In use, the transmission unit 4 is operable to provide a modulated light signal encoded with data to the detector 6 via the optical fibre 8. The detector 6 is operable to decode the modulated light signal so as to extract the data therefrom. In this way, data may be transmitted from the transmission unit 4 to the detector 6. In the example shown in FIG. 1, the transmission unit 4 is located in an avionics bay of the aircraft 2, which is towards the nose of the airplane 2 and behind the flight-deck. The detector 6 is located on a right-hand stabilizer of the aircraft 2. Accordingly, the fibre-optic communication system may be used to transmit data from components in the avionics bay to components in the stabilizer. In an example, the transmission unit 4 may transmit data in the form of control commands that originate from a central computer located in the avionics bay. The detector 6 may receive the control commands via the optical fibre 8 and may provide those control commands to an actuator of the right-hand stabilizer so that the actuator can drive the stabilizer to a new position based on the control commands. As such, fibre-optic data communication may be performed.

The features and operations of the fibre-optic communication system in transmitting data from the transmission unit 4 to the detector 6 via the optical fibre 8 will now be explained with reference to the embodiment of FIG. 2.

Figure 2:
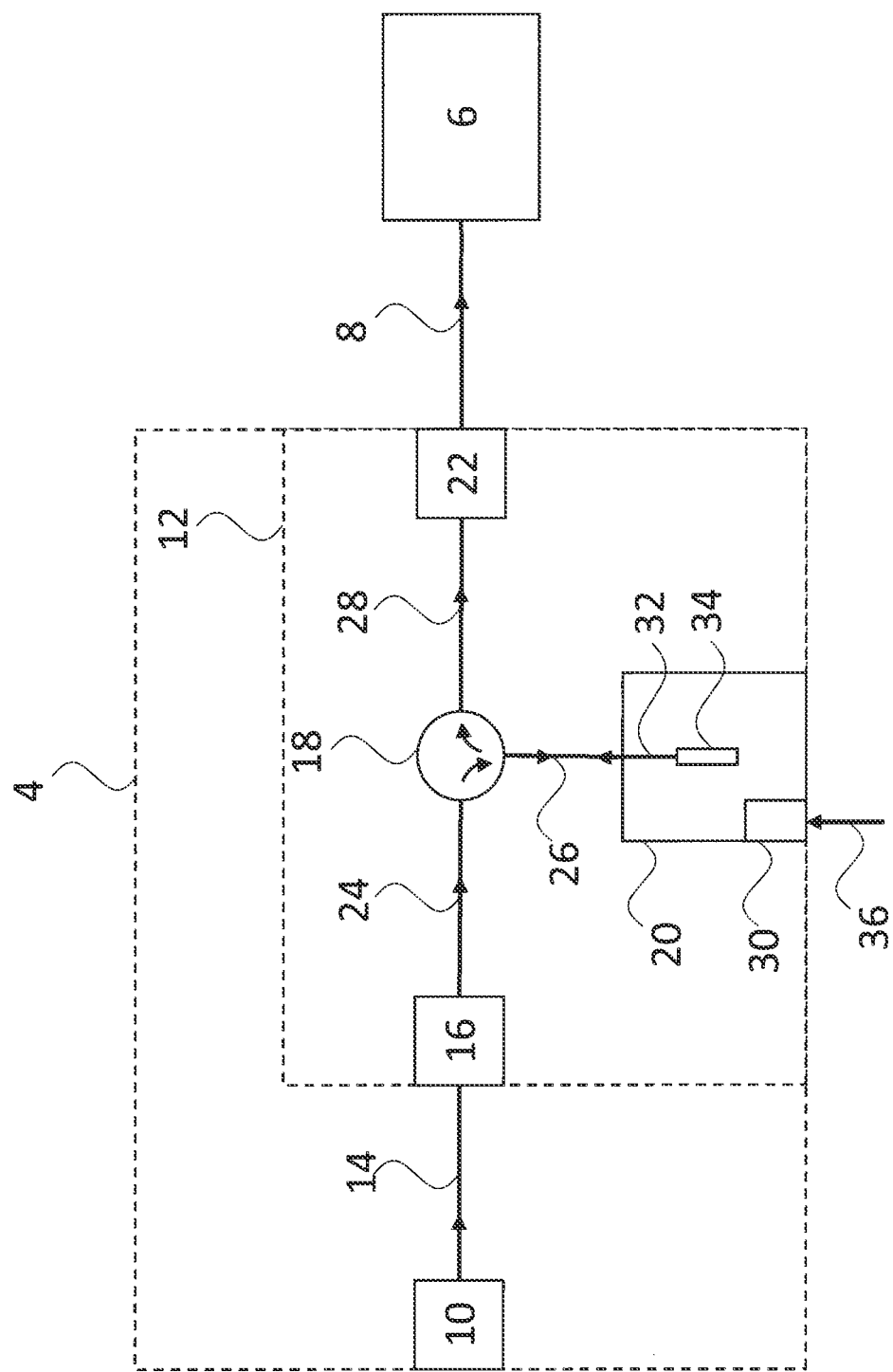
FIG. 2 is a schematic diagram of various internal components of the fibre-optic communication system of FIG. 1, in accordance with an embodiment of the invention.

FIG. 2 illustrates the fibre-optic communication system of FIG. 1 in more detail. The transmission unit 4 includes a light source 10 in optical communication with a communication apparatus 12 via a waveguide 14. For clarity, in FIG. 1, the light source 10 and the communication apparatus 12 are combined into the transmission unit 4; however, it is to be understood that in different embodiments, a light source 10 and a communication apparatus 12 may be provided separately, i.e. they may not be combined into a transmission unit 4.

In an embodiment, the light source 10 is operable to generate light. In the present disclosure, "light" should be interpreted to include the visible light portion of the electromagnetic spectrum, but also the infra-red (IR) and ultraviolet (UV) portions of the electromagnetic spectrum. Also, the light source 12 may use all, or only a portion, of the light spectrum. For instance, the light source 12 may generate: only visible light, or only UV light, or only a combination of visible and IR light. In an embodiment, the light source 10 is a laser or a light emitting diode (LED).

In an embodiment, the light source 10 may be a broadband light source. As such, the light source 10 may simultaneously emit light with a range of different light frequencies or wavelengths. For example, all visible wavelengths may be emitted together, or all visible and IR wavelengths may be emitted together. Alternatively, the light source 10 may be a sweeping light source, for example, a swept laser. As such, the light source 10 may vary a frequency or wavelength of the light emitted in accordance with a periodic sequence, such that all wavelengths emitted by the light source are not necessarily emitted simultaneously. For example, the light source 10 may emit light having the longest wavelength first and then sequentially reduce the wavelength over a time period until light having the shortest wavelength is emitted. At this point, the sequence may be repeated or reversed so as to return to the longest wavelength again. Another option is to have a light source emitting at two or more fixed wavelengths (e.g. by combining two or more laser outputs on waveguide 14). Those two or more wavelengths will be used to carry "0" or "1" or other logic states. In this way, light having a sweeping frequency or wavelength is emitted by the light source 10. For the sake of clarity, unless otherwise stated, it will be assumed that the light source 10 is a broadband light source.

In the present disclosure, the term "waveguide" should be interpreted to mean a physical structure that guides light waves. For example, the waveguide may be a planar, strip or fibre waveguide. The waveguide may be made from glass, polymer, and/or semiconductor. In an embodiment, the waveguide is an optical fibre.

In an embodiment, the communication apparatus 12 includes an input port 16, an optical coupler 18, a modulator 20, and an output port 22. The input port 16 is in optical communication with the light source 10 via the waveguide 14. As such, the input port 16 receives light generated by the light source 10 via the waveguide 14. The input port 16 is in optical communication with the optical coupler 18 via a waveguide 24. Also, the optical coupler 18 is in optical communication with the modulator 20 via a waveguide 26. Further, the optical coupler 18 is in optical communication with the output port 22 via a waveguide 28. In operation, the optical coupler 18 receives light from the input port 16 and provides that light to the modulator 20. Also, the optical coupler 18 receives light from the modulator 20 and provides that light to the output port 22. In this way, light is output from the communication apparatus 12, and transmission unit 4, via the output port 22. In an embodiment, the optical coupler 18 is an optical circulator.

In an embodiment, the modulator 20 includes a logic input 30 and an optical fibre 32 containing a fibre Bragg grating (FBG) 34. The logic input 30 is configured to receive a logic signal 36. In an embodiment, the logic signal 36 is a discrete signal, for example, the logic signal may be a binary signal having two states represented by '1' and '0' bits. It is to be understood that different bits can be represented by different voltage levels of the logic signal, and either bit could be represented by zero volts. It is also to be understood that in at least some other embodiments, more than two discrete states may be defined in the logic signal 36. For example, 3, 4, 6, 10 or more separate states may be present.

It is to be understood that in at least some other embodiments, the waveguide 26 and the fibre 32 are combined together into a single optical fibre which optically connects the optical coupler 18 to the modulator 20.

In the present disclosure, an "FBG" is a type of distributed Bragg reflector constructed in a short segment of optical fibre (e.g. fibre 32) that reflects particular wavelengths of light and transmits all others. This can be achieved by creating a periodic variation in the refractive index of the fibre core, which generates a wavelength-specific dielectric mirror. An FBG can therefore be used as a wavelength-specific reflector. The structure of the FBG can vary via the refractive index, or the grating period. The grating period can be uniform or graded, and either localised or distributed in a superstructure. The refractive index has two characteristics, the refractive index profile, and the offset. Typically, the refractive index profile can be uniform or apodized, and the refractive index offset is positive or zero. In an embodiment, the FBG structure can be: uniform, chirped, tilted, or have a superstructure. In the following description, it is to be understood that the FBG is a uniform FBG unless otherwise stated.

The fibre 32 and the FBG 34 are in optical communication with the waveguide 26 such that light from the light source 10 is transmitted from the optical coupler 18 at the FBG 34. In this way, the FBG 34 is arranged to receive the light from the input port 16. In operation, the FBG 34 reflects light having only a specific wavelength or a specific waveband (i.e. a range of wavelengths). In particular, the FBG 34 may be a narrowband reflector and, as such, may reflect light within only a relatively narrow waveband. In an example embodiment, the waveband is defined by a centre wavelength ±X nm, wherein X is: 0.01, 0.05, 0.1, 0.2, 0.5, 1, 2, 4, 7, 9, 15, 20, 30, and 50. In an embodiment, X is small (e.g. less than or equal to 0.2 nm) so as to reduce the differences between corresponding strain forces to be applied. Any light which is reflected by the FBG 34 is directed back along the fibre 32, then along waveguide 26, to the optical coupler 18.

In an embodiment, the modulator 20 varies a strain force applied to the fibre 32 by the modulator 20. Straining the fibre 32 indirectly strains the FBG 34 within the fibre 32. Straining the FBG 34 modifies its structure, for example, modifies the shape of the periodic variations in refractive index and/or modifies the shape of the spaces between those periodic variations. Such modifications alter the waveband at which the FBG 34 reflects light. Therefore, varying the strain force applied to the fibre 32 varies the waveband at which the FBG 34 reflects.

In the present embodiment, the modulator 20 varies the strain force applied to the fibre 32 according to the logic signal 36 provided at the logic input 30. For example, when the logic signal 36 is a '0' bit, the modulator 20 applies a first (e.g. smaller) strain force to the fibre 32 such that the FBG 34 reflects light within a first waveband back to the optical coupler 18. Additionally, when the logic signal 36 is a '1' bit, the modulator 20 applies a second (e.g. larger) strain force to the fibre 32 such that the FBG 34 reflects light within a second waveband back to the optical coupler 18. As such, the modulated light signal emitted from the modulator 20 is a discrete output since it is encoded with discrete information (i.e. '0' and '1' bits) Accordingly, the communication apparatus 12 may be considered an optical discrete signal output (DSO) device.

In an embodiment, the first and second strain forces may be selected such that the first and second wavebands do not overlap significantly or, alternatively, at all. For example, the need to regulate the temperature of the modulator 20 is reduced or eliminated is a sufficient wavelength separation is maintained between the first and second wavebands, such as, for example, at least 10 nm. In an embodiment, the first and second wavebands may be or may include standard telecoms wavelengths (C-band=1530 nm to 1565 nm). In an embodiment, the first waveband is centred around 1540 nm and the second waveband is centred around 1555 nm, or vice versa. In an embodiment, wavebands may be separated such full width half maximum (FWHM) ranges do not overlap.

In this way, the modulator 20 modulates a wavelength of the light reflected by the FBG 34 back to the optical coupler 18 according to the logic signal 36. This light reflected by the FBG 34 forms a modulated light signal which is emitted from the modulator 20. The modulated light signal is then transmitted from the modulator 20 to the optical coupler 18 via the waveguide 26, and output from the communication apparatus 12 by the output port 22 via the waveguide 28.

As mentioned with above reference to FIG. 1, the transmission unit 4 may be in optical communication with the detector 6 via optical fibre 8. As shown in FIG. 2, the communication apparatus 12 may be in optical communication with the detector 6 via the optical fibre 8. In this way, the modulated light signal emitted from the communication apparatus 12 is transmitted to the detector 6 via the optical fibre 8. The detector 6 is operable to decode the modulated light signal so as to extract the logic signal 36 therefrom. In this way, data may be transmitted from the transmission unit 4 to the detector 6. For completeness, the term 'modulate' is taken to mean the encoding of information (or logic or data) to a media (e.g. light) in such a way that the information may be extracted or retrieved from the media at another point (e.g. the detector 6). A description of the extraction phase and example embodiments of the detector 6 are provided later with reference to FIGS. 7 and 8.

In an embodiment, the two logic states of the logic input are represented by a voltage value which is not 0V, e.g. 5V for '0' and 10V for '1'. In this way, the two separate logic states (i.e. '0' and '1') can be recovered from the wavelength of the modulated light signal, as described above. That is, the logic state '0' can be identified by a first waveband and the logic state '1' can be identified by a second waveband. Therefore, if the optical fibre 8 is broken or there is a fault with the light source 10, the detector 6 will be able to distinguish with respect to the logic states '0' and '1' because there will be no light on the optical fibre 8. This might not be the case for standard electrical assemblies, such as, DSO assemblies. Additionally or alternatively, a 0V level of the logic signal can be associated with a third logic state. The third logic state could be associated with an 'inactive' state or could indicate that there is an electrical power shut-down. The third logic state would also be associated with a corresponding third strain force and third waveband, as would be understood from the above description.

In a version of FIG. 2 in which the light source 10 is a sweeping light source, such as a swept laser, the light source 10 may emit light in which a wavelength of the light continually sweeps within a range of wavelengths. It is to be assumed that the range includes both the first and second (and third) wavebands. In an embodiment, the sweeping rate of the light source 10 is sufficiently high to ensure that the modulated light signal on the optical fibre 8 will flicker at a rate that is acceptable for the detector 6 to detect the logic signal 36 from the wavelength of the modulated light signal. For example, if the sweeping rate is 1 kHz, the flickering rate will be 1/1 kHz, i.e. 1 ms. Therefore, the detector 6 must be able to sample the modulated light signal more than once every 1 ms in order to accurately recover the logic signal 36.

Two different example implementations of the modulator 20 will now be described with reference to FIGS. 3 to 5. In each of FIGS. 3 to 5, the light source 10, the input port 16, the optical coupler 18, the output port 22, and the detector 6 are not shown for clarity. However, it is to be understood that these elements of FIG. 2 would be present in each of the implementations of FIGS. 3 to 5.

Figure 3:
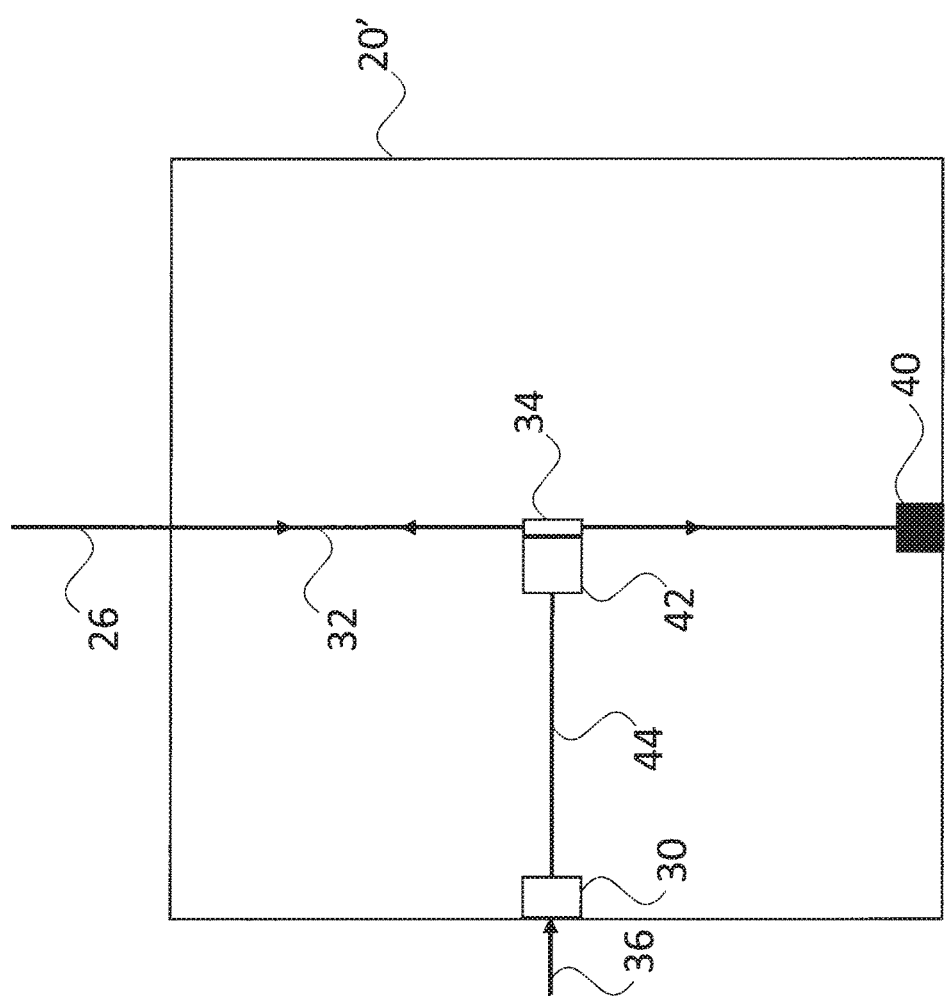
FIG. 3 is a schematic diagram of a modulator of the fibre-optic communication system of FIG. 2, in accordance with an embodiment of the invention.

FIG. 3 illustrates a modulator 20' in optical communication with the waveguide 26. Specifically, the optical fibre 32 of the modulator 20' is in optical communication with the waveguide 26 such that the FBG 34 is positioned to receive light from the light source 10, as mentioned above. The modulator 20' further includes a light absorption element 40 which is optically coupled to the fibre 32 so as to receive light transmitted by the FBG 34. The light absorption element 40 is operable to absorb light transmitted by the FBG 34 such that it does not reflect back to the optical coupler 18 and corrupt the modulated light signal. In an embodiment, some or all of the light transmitted by the FBG 34 is absorbed by the light absorption element 40.

In an embodiment, the modulator 20' further includes a transducer 42 physically coupled (e.g. via a bonding agent or adhesive, or by press-fitting, or otherwise) to the fibre 32. The transducer 42 is in electrical communication with the logic input 30 via an electrical link 44. In an embodiment, the logic input 30 is an electrical input and the logic signal 36 is an electrical signal. The transducer 42 is operable to generate a strain force based on an electrical signal and, as such, the transducer 42 is operable to generate the strain force based on the electrical logic signal 36. Further, the transducer 42 is physically coupled to the fibre 32 at a position of the fibre 32 such that the strain force generated by the transducer 42 is indirectly applied to the FBG 34 via the fibre 32. For example, the transducer 42 may be physically coupled to a portion of the fibre 32 containing the FBG 34. It is to be understood that the transducer 42 may be directly physically connected to the fibre 32 or indirectly physically connected to the fibre 32 via an intermediate coupling (not shown). In either case, a strain force generated by the transducer 42 is indirectly applied to the FBG 34. It is to be understood that the direct or indirect physical connection could be achieved using a bonding agent or an adhesive, or by press-fitting, or otherwise.

In operation, the transducer 42 receives the logic signal 36 via the link 44 and applies a strain force to the fibre 32 so as to strain the FBG 34. A magnitude of the stain force is dependent on the logic signal 36. For example, when the logic signal 36 contains a '0' bit, the transducer 42 applies a strain force of a first (e.g. smaller) amount to the FBG 34;

however, when the logic signal 36 contains a '1' bit, the transducer 42 applies a strain force of a second (e.g. larger) amount to the FBG 34.

As mentioned above, straining the FBG 34 modifies its structure. Such modifications alter the waveband at which the FBG 34 reflects light. Therefore, varying the strain force applied to the fibre 32 varies the waveband at which the FBG 34 reflects. In this way, a wavelength of light reflected by the FBG 34 varies according to the logic signal 36. For example, when the strain force is the first (e.g. smaller) amount, the light reflected by the FBG 34 contains only wavelengths within a first waveband and, when the strain force is the second (e.g. larger) amount, the light reflected by the FBG 34 contains only wavelengths within a second waveband.

In an embodiment, the transducer 42 is an electro-mechanical transducer. Accordingly, the transducer 42 contains a material which generates a mechanical strain force when subjected to electricity. In an example, the electro-mechanical transducer is a piezoelectric crystal actuator which contains a piezoelectric crystal that generates a mechanical force when an electrical signal is applied to it. A magnitude of the mechanical force is proportional to the potential or voltage of the electric signal. In an embodiment, the transducer 42 (or at least the piezoelectric crystal) may be physically bonded to the fibre 32 by an adhesive or other bonding agent so as to transfer the mechanical force to the fibre 32 thereby straining the fibre 32 and the FBG 34.

In an embodiment, the transducer 42 is an electro-magneto-mechanical transducer. Accordingly, the transducer 42 contains a material which generates a mechanical strain force when subjected to a magnetic field which is generated by an electric signal. In an example, the electro-magneto-mechanical transducer is a magnetostrictive transducer which contains magnetostrictive material that generates a mechanical force when in the presence of a magnetic field. The magnetostrictive transducer may also include, or may be adjacent to, a coil which generates the magnetic field when an electrical signal is applied to it. In this way, the electric logic signal 36 may be transmitted to the coil via the link 44 such that the coil generates a magnetic field having a field strength proportional to the potential or voltage of the electric signal. In turn, the magnetostrictive material may be in the presence of the magnetic field and may generate a mechanical force with a magnitude proportional to the magnetic field strength. In an embodiment, the transducer 42 (or at least the magnetostrictive material) may be physically bonded to the fibre 32 by an adhesive or other bonding agent so as to transfer the mechanical force to the fibre 32 thereby straining the fibre 32 and the FBG 34.

Figure 4:
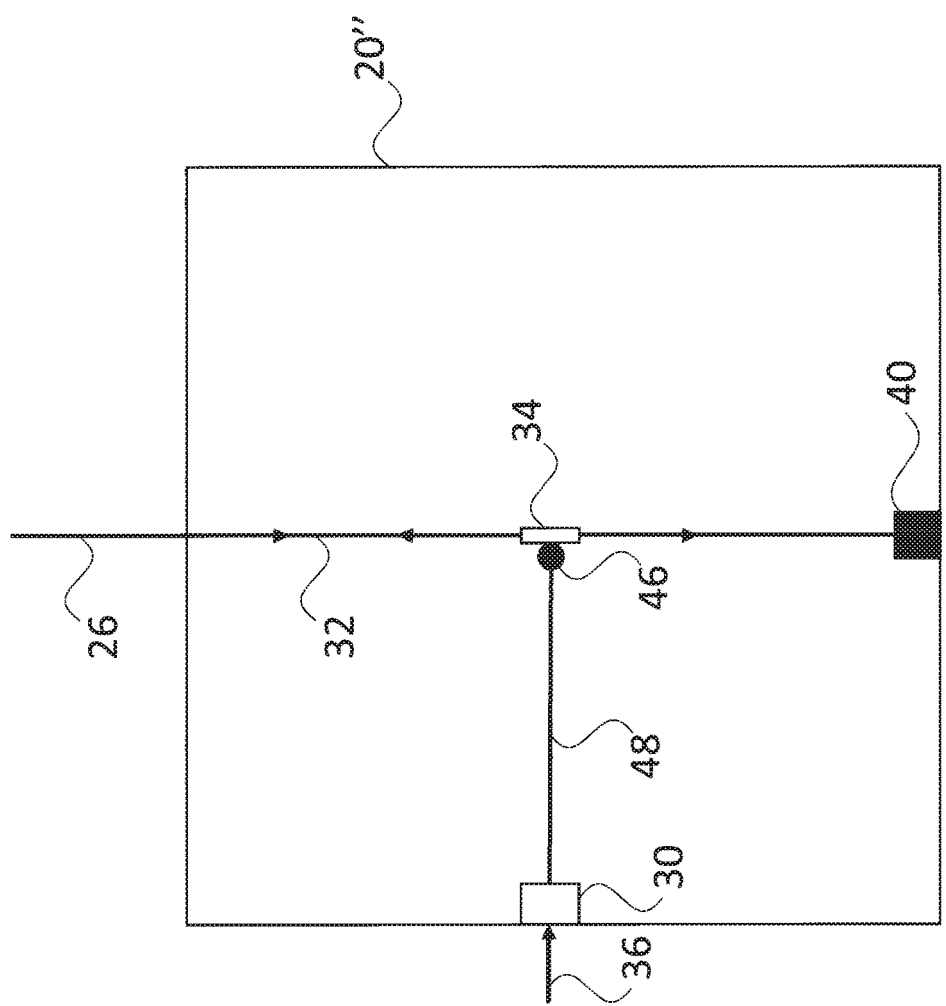
FIG. 4 is a schematic diagram of a modulator of the fibre-optic communication system of FIG. 2, in accordance with another embodiment of the invention.

FIG. 4 illustrates a modulator 20" in optical communication with the waveguide 26. Specifically, the optical fibre 32 of the modulator 20" is in optical communication with the waveguide 26 such that the FBG 34 is positioned to receive light from the light source 10, as mentioned above. As before, the modulator 20" further includes a light absorption element 40 which is optically coupled to the fibre 32 so as to receive light transmitted by the FBG 34.

In an embodiment, the modulator 20" further includes a mechanical actuator 46 physically coupled (e.g. via a bonding agent or adhesive, or by press-fitting, or otherwise) to the fibre 32. The actuator 46 is in mechanical communication with the logic input 30 via a mechanical link 48. In an embodiment, the logic input 30 is a mechanical input (e.g. a button, switch or dial) and the logic signal 36 is a mechanical signal. The actuator 46 is operable to generate a strain force based on a mechanical signal and, as such, the actuator 46 is operable to generate the strain force based on the mechanical logic signal 36. Further, the actuator 46 is physically coupled to the fibre 32 at a position of the fibre 32 such that the strain force generated by the actuator 46 is indirectly applied to the FBG 34 via the fibre 32. For example, the actuator 46 may be physically coupled to a portion of the fibre 32 containing the FBG 34. It is to be understood that the actuator 46 may be directly physically connected to the fibre 32 or indirectly physically connected to the fibre 32 via an intermediate coupling (not shown). In either case, a strain force generated by the actuator 46 is indirectly applied to the FBG 34. It is to be understood that the direct or indirect physical connection could be achieved using a bonding agent or an adhesive, or by press-fitting, or otherwise.

In operation, the actuator 46 receives the logic signal 36 via the link 48 and applies a strain force to the fibre 32 so as to strain the FBG 34. A magnitude of the stain force is dependent on the logic signal 36. For example, when the logic signal 36 is at a first state, the actuator 46 applies a strain force of a first (e.g. smaller) amount to the FBG 34; however, when the logic signal 36 is at a second state, the actuator 46 applies a strain force of a second (e.g. larger) amount to the FBG 34.

As before, varying the strain force applied to the fibre 32 varies the waveband at which the FBG 34 reflects. In this way, a wavelength of light reflected by the FBG 34 varies according to the logic signal 36.

In an embodiment, the logic input 30 is a push button which can be moved or toggled between two states: a first state in which the push button is depressed (i.e. not pressed), and a second state in which the push button is pressed. The push button may latch in either state meaning that the push button must be physically pressed to move from the first state to the second state, and move from the second state to the first state. In any case, the mechanical logic signal 36 may be applied to the push button such that when the logic signal 36 is in the first state (e.g. the push button is depressed) the push button communicates a first mechanical force via the mechanical link 48 to the mechanical actuator 46, and when the logic signal 36 is in the second state (e.g. the push button is pressed) the push button communicates a second mechanical force via the mechanical link 48 to the mechanical actuator 46. In turn, on receipt of the first mechanical force, the mechanical actuator 46 applies a first (e.g. smaller) strain force directly to the fibre 32 (and indirectly to the FBG 34), whereas on receipt of the second mechanical force, the mechanical actuator 46 applies a second (e.g. larger) strain force directly to the fibre 32 (and indirectly to the FBG 34).

In summary, therefore, the logic signal 36 can be either an electrical signal or a mechanical signal. When an electrical signal, the modulator 20' can include a transducer 42 to convert the different electrical states of the electrical signal into different mechanical strain forces which are applied to the FBG 34. When a mechanical signal, the modulator 20" can include a mechanical logic input 30 which generates different mechanical states according to different states of the mechanical signal and uses a mechanical actuator 46 to apply corresponding different mechanical strain forces to the FBG 34. In this way, a wavelength of light reflected by the FBG 34 varies according to the logic signal 36. Furthermore, a light signal emitted by the modulator 20', 20" has a wavelength which is modulated according to the logic signal 36. Stated differently, the logic signal 36 is encoded in the wavelength of the light reflected by the FBG 34 and emitted from the modulator.

An extension to the embodiment of FIG. 4 will now be described with reference to FIG. 5.

Figure 5:
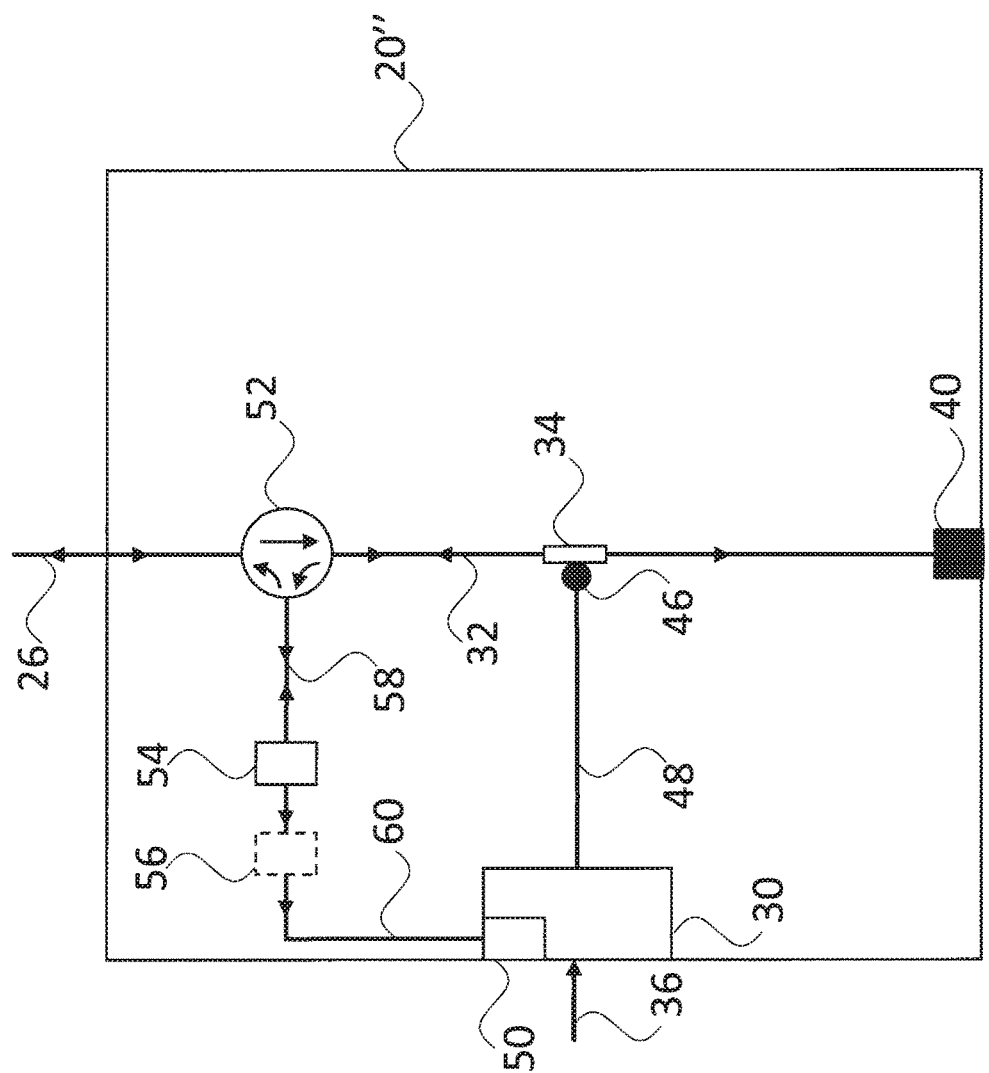
FIG. 5 is a schematic diagram of a modulator of the fibre-optic communication system of FIG. 2, in accordance with a further embodiment of the invention.

FIG. 5 illustrates the modulator 20" which is comparable to that of FIG. 4; however, in FIG. 5, the modulator 20" further includes a visual indicator 50. The visual indicator 50 is associated with the logic input 30. In this embodiment, the logic input 30 is a push button; however, it is to be understood that in some other embodiments, the logic input 30 may be a different type of input or mechanical input, such as, for example, a dial or a toggle switch. In any case, the nature of the association may be that the visual indicator 50 is positioned close to, in contact with, or integrated with, the logic input 30. In the embodiment of FIG. 5, the portion of the push button which moves between the two aforementioned two states houses the visual indicator 50 such that the visual indicator 50 is formed integrally with the push button.

In the embodiment of FIG. 5, the visual indicator 50 is formed integrally with the logic input 30, so as to be part of the modulator 20". However, it is to be understood that in at least some other embodiments the visual indicator 50 is separate from the modulator 20", i.e. is positioned away from the modulator 20". Regardless of the relative positioning of the visual indicator 50 and the modulator 20", the visual indicator 50 is in optical communication with the modulator 20" so as to receive at least part of the modulated light signal therefrom. Also, the visual indicator 50 is operable to generate a visual indication based on the at least part of the modulated light signal. In an embodiment, the visual indicator 50 includes a light port or a photoluminescent material which, on receipt of the at least part of the modulated light signal, illuminates so as to provide the visual indication. In an embodiment, the light port is device that allows the visualisation of the light reflected from the FBG 34, such as an optical light diffusion element to spread light coming out of the fibre 32.

In the embodiment of FIG. 5, the modulator 20" further includes an extra optical coupler 52, a semi-reflective reflector 54 and, optionally, an optical filter 56. The extra optical coupler 52 is positioned in the fibre 32 and between the FBG 34 and the optical coupler 18. The optical coupler 52 is in optical communication with the semi-reflective reflector 54 via a waveguide 58. The semi reflective reflector 54 is in optical communication with the visual indicator 50 via a waveguide 60. Optionally, the waveguide 60 includes the optical filter 56. In an embodiment, the semi-reflective reflector 54 is a semi-reflective mirror.

In operation, the extra optical coupler 52 receives light from the optical coupler 18 and transmits that light to the FBG 34 via the fibre 32. Also, the extra optical coupler 52 receives the modulated light signal from the FBG 34 via the fibre 32 and transmits the modulated light signal to the semi-reflective reflector 54 via the waveguide 58. The semi-reflective reflector is operable to transmit a first portion of light incident upon it and reflect a remaining portion. Accordingly, a first portion of the modulated light signal is transmitted from the semi-reflective reflector 54 to the visual indicator 50 via the waveguide 60, whereas a remaining portion of the modulated light signal is reflected from the semi-reflective reflector 54 to the extra optical coupler 52. In an embodiment, the semi-reflective reflector 54 may reflect more light than it transmits. For example, the semi-reflective reflector 54 may transmit 5% of incident light and reflect 95% of incident light. In any case, reflected light from the semi-reflective reflector 54 is communicated to the extra optical coupler 52 which then transmits that light back to the optical coupler 18. In an embodiment, the optical coupler 52 is an optical circulator.

In summary, therefore, the extra optical coupler 52 in combination with the semi-reflective reflector 54 provides a mechanism for bleeding-off or extracting a small amount of the modulated light signal for use by the visual indicator 50. As mentioned above, the visual indicator 50 generates a visual indication (e.g. by illuminating) on receipt of the bled-off or extracted portion of the modulated light signal.

In an embodiment, the optical filter 56 is not present and the modulated light signal contains two wavebands of light corresponding to the two strain forces applied to the FBG 34. Each waveband may include light radiation of a different colour, for example, the first waveband could be blue light and the second waveband could be green light. If the visual indicator 50 is a light port, which illuminates incident light, each state of the modulated light signal may cause the visual indicator 50 to illuminate with a different colour (e.g. blue or green). Accordingly, different states may be separately colour coded or identifiable.

Alternatively, one waveband may include light radiation of a visible colour (e.g. red), and the other waveband may include light radiation which is not directly visible to the human eye (e.g. IR). If the visual indicator 50 is a light port, which illuminates incident light, one state of the modulated light signal may cause the visual indicator 50 to illuminate (e.g. red light) whereas the other state will not (e.g. no visible light). Accordingly, different states may be separately identifiable.

Alternatively, in an embodiment, the optical filter 56 is present and is operable to prevent transmission of light from one of the wavebands but permit transmission of light from the other of the wavebands. For example, each waveband may include light radiation of a different colour, for example, the first waveband could be blue light and the second waveband could be green light. Also, the optical filter 56 could be configured to permit blue light but block green light. If the visual indicator 50 is a light port, which illuminates incident light, one state of the modulated light signal may cause the visual indicator 50 to illuminate (e.g. glow blue) whereas the other state will not (e.g. green light is filtered out by optical filter 56). Accordingly, different states may be separately identifiable.

Alternatively, the visual indicator 50 may include photoluminescent material operable to illuminate once light incident upon it has energy above a threshold. In an embodiment, the photoluminescent material may be a phosphorescent material. Accordingly, even if the light reflected by FBG 34 is in a non-visible range (e.g. IR or UV), the photoluminescent material can convert it to visible light (e.g. red, green or blue light) so that it can be seen by a human operator. The optical filter 56 may be absent. The wavebands may be chosen such that light of the first waveband possesses an energy which is above the threshold, whereas light of the second waveband possessed an energy which is below the threshold. Accordingly, when the modulated light signal contains light of the first waveband (e.g. indicating an on state), the visual indicator 50 may be illuminated. Alternatively, when the modulated light signal contains light of the second waveband (e.g. indicating an off state), the visual indicator 50 may be not illuminated.

In the embodiment of FIG. 5, the extra optical coupler 52, the semi-reflective reflector 54, the optical filter 56 and the visual indicator 50 are part of the modulator 20". However, it is to be understood that in some other embodiments, some or all of these components may be separate from the modulator 20".

Figure 6:
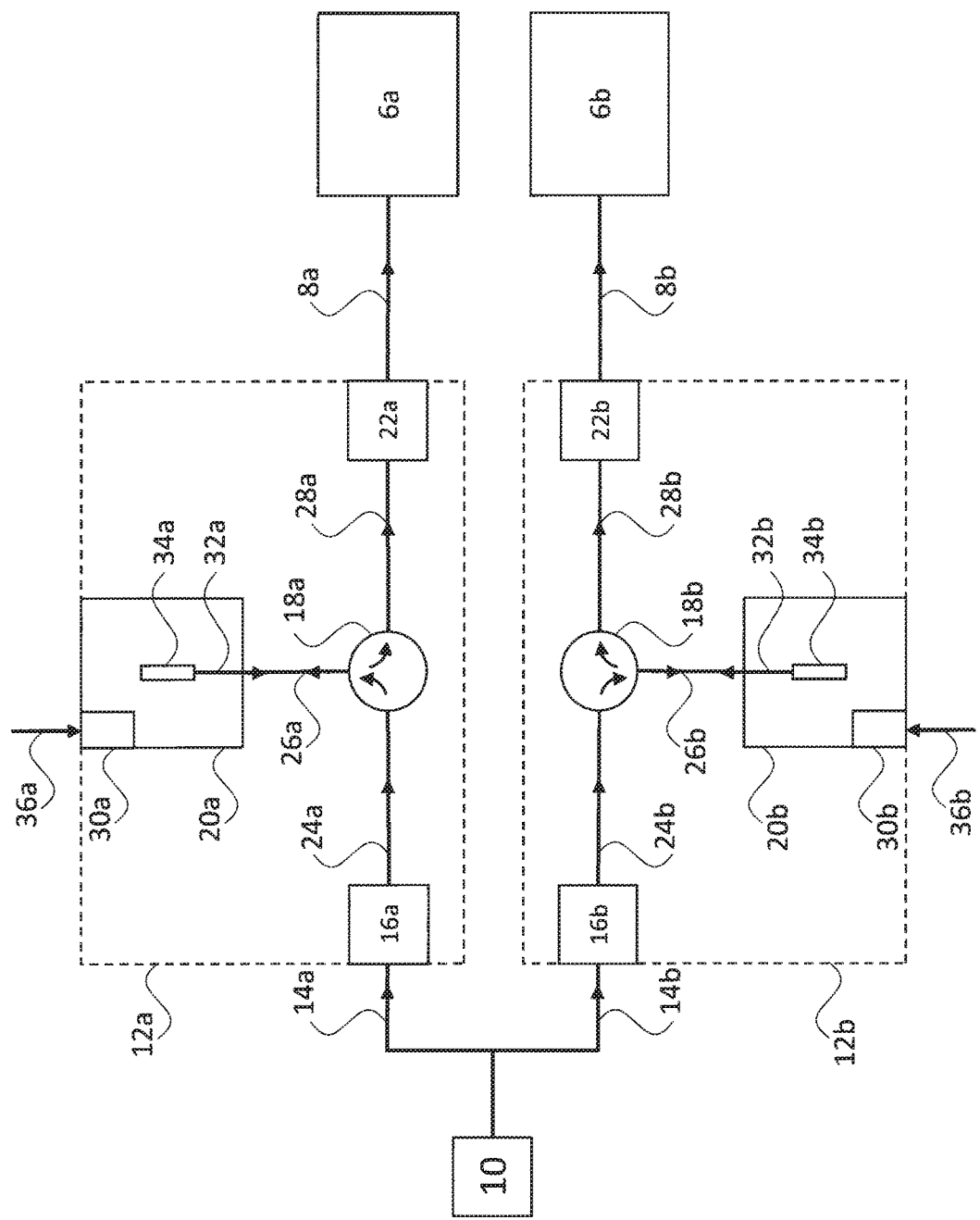
FIG. 6 is a schematic diagram of a fibre-optic communication system in accordance with another embodiment of the invention.

FIG. 6 illustrates a multiplexing extension which could apply to any of the above-described embodiments; however, it is illustrated with reference to the embodiment of FIG. 2. Specifically, the light source 10 is separated out from the remainder of the communication system and the remainder of the communication system is then duplicated to form a communication system A and a communication system B. To illustrate this, the remaining elements of each communication system are labelled either 'a' or 'b' to indicate whether they belong to system 'A' or 'B'. Both system A and system B are optically coupled to the light source 10 such that the same light source 10 provides light to power multiple communication systems.

It is to be understood that the embodiment of FIG. 6 shows a single light source 10 powering a system A and an additional system B; however, in some other embodiments, more than two systems may be powered by a single light source. For example, 4, 7, 9, 10, 15, 20, 50 or 100 separate communication systems could be powered by the same light source; however, each system can provide an independent discrete output. That is, multiple different communication systems can be multiplexed together so as to use the same light source.

In an alternative arrangement, the systems A and B of FIG. 6 may use and be connected to the same detector 6. That is, a single detector 6 may detect modulated light signals from multiple communication apparatuses. In this embodiment, one modulated light signal may use different wavebands to the other modulated light signal such that the signals are separately identifiable by the common detector 6.

Figure 7:
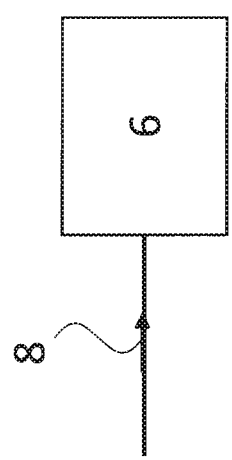
FIG. 7 is a schematic diagram of a detector in accordance with an embodiment of the invention.

FIG. 7 illustrates a detector 6 within an embodiment of the invention. The detector 6 is in optical communication with the communication apparatus 12 via the optical fibre 8 so as to receive the modulated light signal therefrom. The detector 6 is operable to detect a wavelength of the modulated light signal and to extract the logic signal 36 from the detected wavelength. In an embodiment, the detector 6 is a spectrometer. The spectrometer may be configured to visualise the full spectrum of interest and whether the modulated light signal contains light from the first waveband or the second waveband. Furthermore, the spectrometer may be configured to deal with certain anomalies in the modulated light signal. For example, if no optical signal is received, the spectrometer may deduce that the communication apparatus 12 and/or the light source 10 is malfunctioning, and/or that the optical fibre 8 is broken.

Figure 8:
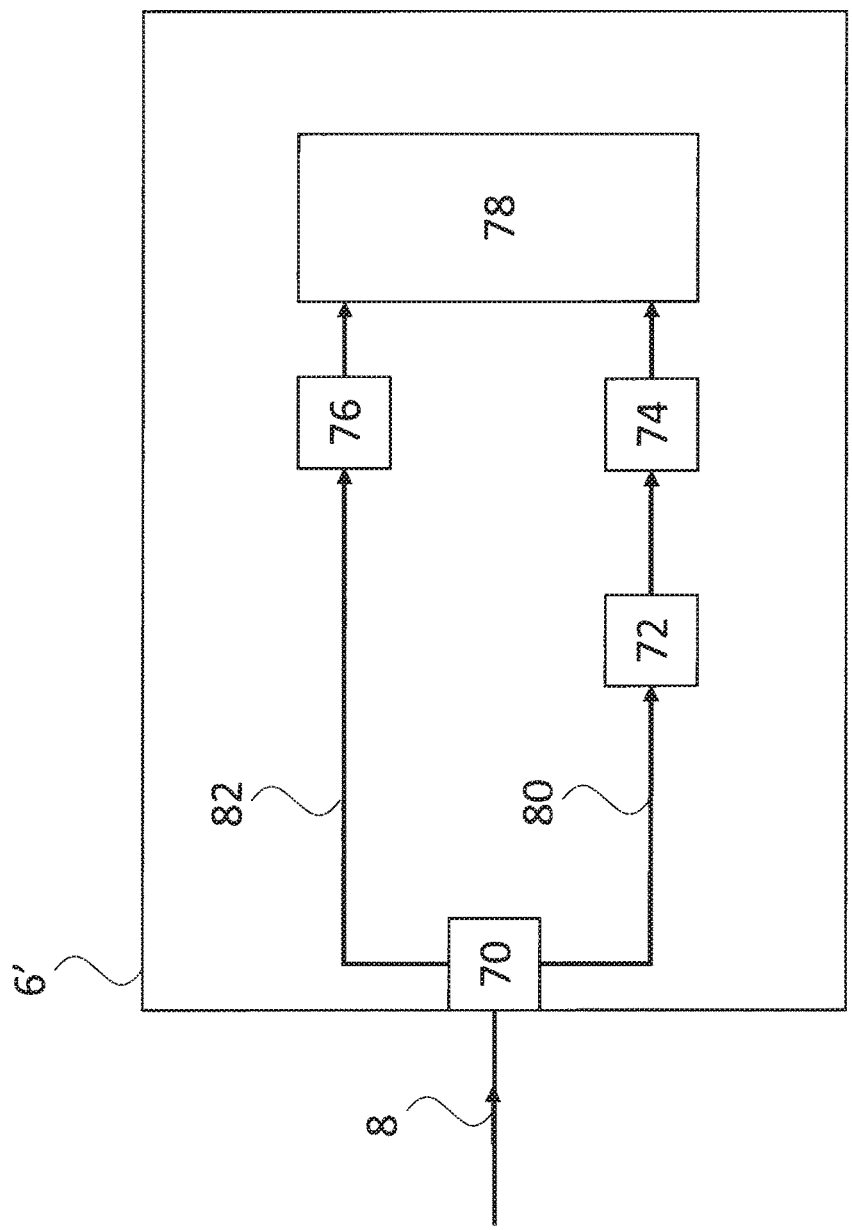
FIG. 8 is a schematic diagram of a detector in accordance with a further embodiment of the invention.

FIG. 8 illustrates a detector 6' in accordance with another embodiment. Specifically, detector 6' includes: an optical splitter 70, an optical filter 72, a first photodetector 74, a second photodetector 76, and a logic unit 78. The optical splitter 70 is arranged to transmit the modulated light signal along a first optical detection path 80 to the logic unit 78 and along a second optical detection path 82 to the logic unit 78. In an embodiment, 50% of the modulated light signal may be transmitted along each optical detection path. The first optical detection path 80 contains the optical filter 72 and the first photodetector 74. The second optical detection path 82 contains the second photodetector 76. The optical filter 72 is operable to permit or prevent light reaching the second photodetector based on a wavelength of the light. As described above in detail, the modulated light signal contains either light from a first waveband or light from a second waveband. In an embodiment, the optical filter 72 is configured to block transmission of light from the one (e.g. first) waveband but permit transmission of light from the other (e.g. second) waveband. The optical filter 72 may be a narrow band filter.

In operation, the second photodetector 76 will receive light if the modulated light signal is present, since it will see both light from the first waveband and light from the second waveband. On the other hand, the first photodetector 74 will only receive light if the modulated light signal is present and contains light of the permitted (e.g. second) waveband. This is because the optical filter 72 will prevent light of one (e.g. first) waveband from reaching the first photodetector 74. Both the first photodetector 74 and the second photodetector 76 generate a signal to the logic unit 78 when they detect light. Accordingly, the logic unit 78 is operable to extract the logic signal by generating a first logic state if both photodetectors 74, 76 detect light, a second logic state if only one photodetector detects light, and a fault state if neither photodetector detects light. In this way, the logic signal 36 can be recovered by the logic unit 78 based on the first and second logic states generated by the logic unit 78. Additionally, if the logic unit 78 identifies a fault state, the detector 6' may deduce that the communication apparatus 12 and/or light source 10 is malfunctioning, and/or that the optical fibre 8 is broken.

In the above-described embodiments, generally, two logic states (i.e. '0' and '1') are defined, which cause two different strain forces so that the modulated light signal includes light from only two different wavebands. As such, embodiments provide an optical discrete signal output device. However, it is to be understood that in at least some other embodiments, more than two logic states may be present, such that more that two separate strain forces are present, and such that light from more than two separate wavebands is present in the modulated light signal. For example, there may be 3, 4, 5, 10 or more separate logic states, strain forces and wavebands.

Various embodiments provide many advantages. For example, the communication apparatus and system are electrically passive. Also, the communication apparatus and system are simple and are made of only a relatively small number of passive optical components. Additionally, the susceptibility of the communication apparatus and system to electromagnetic interference or hazards is reduced compared to similar electrical versions because data is communicated via an optical fibre. Further, it is possible to provide a multiplexed arrangement which simplifies the design. Furthermore, regarding aircraft applications, there is a reduced need to provide lightening protection compared to similar electrical versions because data is communicated between via an optical fibre. Also, the two ends of the communication system (e.g. the communication apparatus and the detector) do not need to be electrically isolated because they are linked optically.

A further advantage of at least some of the above-described embodiments is that the optical assembly can discriminate between a logic state '0' (i.e. when light of a first waveband is received) and a logic state '1' (i.e. when light of a second waveband is received), but also when there is a fault (i.e. when no light is received). In contrast, electrical systems are only able to distinguish between '0' and '1' and have limited built-in test capabilities.

A further advantage the above-described embodiments utilizing an electrical logic input signal, is that it may be retro-fitted to existing electrical DSO devices. For example, the arrangement of FIG. 3 may be configured to generate the first strain force when a '0' bit is received on the electrical signal and to generate the second strain force when a '1' bit is received electrical signal.

A feature of at least some of the above-described embodiments is that the modulator is not in-line between the light source and the detector. For example, because the modulated light signal is generated from light reflected by the FBG and not from light transmitted by the FBG, the modulator is positioned out-of-line (i.e. not in-line). Specifically, the modulator is located on a waveguide (e.g. waveguide 26) which is separate from, and out-of-line with, the waveguides (i.e. waveguides 24 and 28) that are in-line between the light source and detector.

A feature of at least some of the above-described embodiments is that the detector and light source are not necessarily located together. Specifically, the light source is located at one end of the optical fibre 8 and the detector is located at the opposite end. Therefore, data can be transmitted between different locations in the working environment. For example, considering an airplane, data can be transmitted from one location (e.g. an avionics bay near the nose) to a different location (e.g. a stabilizer near the tail).

A feature of the above-described embodiments is that a modulator (e.g. modulator 20) is operable to vary a strain force applied to a fibre (e.g. fibre 32) according to a logic signal received at a logic input (e.g. logic input 30) to modulate a wavelength of a modulated light signal reflected by an FBG (e.g. FBG 34) back to an optical coupler (e.g. optical coupler 18). In an embodiment, the strain force is axial, radial and/or lateral. Additionally or alternatively, the strain force can include a squeeze and/or twist of the fibre. Additionally or alternatively, the strain force can include any other form of applying physical stress to the fibre. In any case, it is to be understood that the strain force acts on the fibre to deform the fibre so as to cause a transformation of the fibre from a first configuration (e.g. non-deformed) to a second configuration (e.g. deformed). In this context, a configuration is understood to mean a set containing the positions of all particles of the fibre. It is to be understood that the deformation may be caused by an external load (e.g. a mechanical force generated by the transducer 42 or actuator 46). As mentioned above, since the FBG is contained within the fibre, the strain force applied to the fibre is transferred to and experienced by the FBG.

The features and advantages of various different embodiments are described above with reference to the Figures. It is to be understood that one or more features from one embodiment may be combined with one or more features of one or more other embodiments to form new embodiments which are covered by the scope of the appended claims. For example, one or more of the different communication apparatuses of FIGS. 2 to 5 may be used in the multiplexed embodiment of FIG. 6. For example, the multiplexed embodiment may include one or more copies of the communication apparatus of FIG. 3. Additionally or alternatively, the multiplexed embodiment may include one or more copies of the communication apparatus of FIG. 4. Additionally or alternatively, the multiplexed embodiment may include one or more copies of the communication apparatus of FIG. 5. Also, the detector of FIGS. 7 and 8 may be included in any of the embodiments of FIGS. 1 to 6. Additionally, any of the embodiments of FIGS. 1 to 8 can be used with either a broadband light source or a sweeping light source.

Although the invention has been described above with reference to one or more preferred embodiments, it will be appreciated that various changes or modifications may be made without departing from the scope of the invention as defined in the appended claims.

The invention claimed is:

1. A communication apparatus for a fibre-optic communication system, the apparatus comprising:
   an optical coupler;
   an input port optically coupled to the optical coupler via a first waveguide, the input port being arranged to receive light;
   a modulator optically coupled to the optical coupler via a second waveguide, the modulator comprising a logic input and a fibre having a fibre Bragg grating (FBG) arranged to receive the light from the input port via the optical coupler, the modulator being operable to vary a strain force applied to the fibre according to a logic signal received at the logic input to modulate a wavelength of a modulated light signal reflected by the FBG back to the optical coupler;
   an output port optically coupled to the optical coupler via a third waveguide so as to receive the modulated light signal therefrom, the output port being operable to output the modulated light signal, and
   a transducer or mechanical actuator physically coupled to the fibre in the modulator and in communication with the logic input, and the transducer or the mechanical actuator is operable to generate the strain force based on the logic signal.

2. The apparatus of claim 1, wherein the logic signal is an electrical signal, and wherein the transducer or the mechanical actuator is the transducer that is physically coupled to the fibre and in electrical communication with the logic input, wherein the transducer being operable to generate the strain force based on the electrical logic signal.

3. The apparatus of claim 2, wherein the transducer is an electro-magneto-mechanical transducer or an electro-mechanical transducer.

4. The apparatus of claim 1, wherein the logic signal is a mechanical signal, and wherein the transducer or the mechanical actuator is the mechanical actuator that is physically coupled to the fibre and in mechanical communication with the logic input, the mechanical actuator being operable to generate the strain force based on the mechanical logic signal.

5. The apparatus of claim 1, further comprising a visual indicator in optical communication with the modulator so as to receive at least part of the modulated light signal therefrom, the visual indicator being operable to generate a visual indication based on the at least part of the modulated light signal, wherein the visual indicator comprises: a light port, or a photoluminescent material.

6. The apparatus of claim 5, wherein the modulator further comprises: an extra optical coupler located within the second waveguide, and a semi-reflective reflector in optical communication with the extra optical coupler and the visual indicator, wherein the extra optical coupler is operable to transmit the light from the optical coupler to the FBG, to transmit the modulated light signal from the FBG to the semi-reflective reflector, and to transmit light reflected by the semi-reflective reflector to the optical coupler, wherein the semi-reflective reflector is operable to transmit a first portion of the modulated light signal to the visual indicator and to reflect a remaining portion of the modulated light signal to the extra optical coupler.

7. The apparatus of claim 6, further comprising an optical filter positioned in an optical path between the semi-reflective reflector and the visual indicator, the optical filter being operable to transmit light to, or block light from, the visual indicator based on a wavelength of the light.

8. The apparatus of claim 1, wherein the modulator further comprises a light absorption element optically coupled to the fibre so as to absorb light transmitted by the FBG.

9. The apparatus of claim 1, wherein the logic signal is a binary signal and the modulator is configured to set the strain force to either one of two different values such that the wavelength of the modulated light signal is set to either one of two different wavebands.

10. The apparatus of claim 1, further comprising: an additional input port, an additional modulator, an additional optical coupler, and an additional output port;
the additional input port being optically coupled to the additional optical coupler via a fourth waveguide, the additional input port being arranged to receive the light;
the additional modulator being optically coupled to the additional optical coupler via a fifth waveguide, the additional modulator comprising an additional logic input and an additional fibre having an additional FBG arranged to receive the light from the additional input port via the additional optical coupler, the additional modulator being operable to vary a strain force applied to the additional fibre according to a logic signal received at the additional logic input so as to modulate a wavelength of an additional modulated light signal reflected by the additional FBG back to the additional optical coupler; and
the additional output port being optically coupled to the additional optical coupler via a sixth waveguide so as to receive the additional modulated light signal therefrom, the additional output port being operable to output the additional modulated light signal.

11. A fibre-optic communication system comprising:
a communication apparatus according to claim 1; and
an optical detector in optical communication with the output port of the communication apparatus so as to receive the modulated light signal therefrom, the optical detector being operable to detect a wavelength of the modulated light signal and to extract the logic signal from the detected wavelength.

12. The fibre-optic communication system of claim 11, wherein the optical detector comprises a spectrometer; or
wherein the optical detector comprises: an optical splitter, an optical filter, a first photodetector, a second photodetector, and a logic unit;
wherein the optical splitter is arranged to transmit the modulated light signal along a first optical detection path to the logic unit and along a second optical detection path to the logic unit, the first optical detection path containing the first photodetector, and the second optical detection path containing the optical filter and the second photodetector, the optical filter being operable to permit or prevent light reaching the second photodetector based on a wavelength of the light; and
wherein the logic unit is operable to extract the logic signal by generating: a first logic state if both photodetectors detect light, a second logic state if only one photodetector detects light, and a fault state if neither photodetector detects light.

13. A vehicle comprising a communication apparatus for a fibre-optic communication system, the communication apparatus comprising:
an optical coupler;
an input port optically coupled to the optical coupler via a first waveguide, the input port being arranged to receive light;
a modulator optically coupled to the optical coupler via a second waveguide, the modulator comprising a logic input and a fibre having a fibre Bragg grating (FBG) arranged to receive the light from the input port via the optical coupler, the modulator being operable to vary a strain force applied to the fibre according to a logic signal received at the logic input so as to modulate a wavelength of a modulated light signal reflected by the FBG back to the optical coupler;
an output port optically coupled to the optical coupler via a third waveguide so as to receive the modulated light signal therefrom, the output port being operable to output the modulated light signal, and
a transducer or mechanical actuator physically coupled to the fibre in the modulator and in communication with the logic input, and the transducer or the mechanical actuator is operable to generate the strain force based on the logic signal.

14. The vehicle of claim 13, further comprising an optical detector in optical communication with the output port of the communication apparatus so as to receive the modulated light signal therefrom, the optical detector being operable to detect a wavelength of the modulated light signal and to extract the logic signal from the detected wavelength.

15. The vehicle of claim 13, wherein the vehicle is an aircraft.

16. The vehicle of claim 13, wherein the logic signal is an electrical signal, and wherein the transducer or the mechanical actuator is the transducer that is physically coupled to the fibre and in electrical communication with the logic input, wherein the transducer being operable to generate the strain force based on the electrical logic signal.

17. The vehicle of claim 16, wherein the transducer is an electro-magneto-mechanical transducer or an electro-mechanical transducer.

18. The apparatus of claim 13, wherein the logic signal is a mechanical signal, and wherein the transducer or mechanical actuator is the mechanical actuator that is physically coupled to the fibre and in mechanical communication with the logic input, the mechanical actuator being operable to generate the strain force based on the mechanical logic signal.

* * * * *